United States Patent [19]
Kobayashi et al.

[11] Patent Number: 5,691,618
[45] Date of Patent: Nov. 25, 1997

[54] BATTERY PACK CHARGING DEVICE

[75] Inventors: Masahiko Kobayashi, Hamura; Tadao Shinozaki, Funabashi; Tomomi Aramaki, Kanagawa, all of Japan

[73] Assignee: Yupiteru Industries Co., Ltd., Tokyo, Japan

[21] Appl. No.: 530,258

[22] PCT Filed: Jan. 31, 1994

[86] PCT No.: PCT/JP94/00131

§ 371 Date: Feb. 16, 1996

§ 102(e) Date: Feb. 16, 1996

[87] PCT Pub. No.: WO95/20828

PCT Pub. Date: Aug. 3, 1995

[30] Foreign Application Priority Data

Nov. 16, 1992 [JP] Japan .................................. 4-328944

[51] Int. Cl.$^6$ ........................... H01M 10/46; H01M 2/10
[52] U.S. Cl. .................................................. 320/2; 429/99
[58] Field of Search ......................... 320/2; 429/96, 429/97, 98, 99, 100; D13/107, 108

[56] References Cited

U.S. PATENT DOCUMENTS

| | | | |
|---|---|---|---|
| 4,588,938 | 5/1986 | Liataud et al. | 320/2 |
| 4,629,962 | 12/1986 | Arakawa | 320/2 |
| 4,829,224 | 5/1989 | Gandelman et al. | 320/2 |
| 5,347,208 | 9/1994 | Lida | 320/2 |
| 5,525,888 | 6/1996 | Toya | 320/2 |

FOREIGN PATENT DOCUMENTS

| | | |
|---|---|---|
| 57-143853 | 9/1982 | Japan . |
| 59-71270 | 4/1984 | Japan . |
| 61-13542 | 1/1986 | Japan . |
| 1-82631 | 6/1989 | Japan . |

*Primary Examiner*—Edward Tso
*Assistant Examiner*—Patrick Law
*Attorney, Agent, or Firm*—Arthur P. Gershman

[57] ABSTRACT

A thin charging device having excellent portability is provided for charging a battery pack while the battery pack remains housed within a communication device. The charging device (10) is constructed from a flat rectangular shaped main body (12) and a cover (13) which is fixed to a rotation shaft (23) so as to be rotatable with respect to the main body to allow the cover to be positioned in either an open or closed position. When the cover is in the closed position, it covers charging terminals (20) provided on the top of the main body and makes the overall dimensions of the charging device roughly equal to the dimensions of the main body. On the other hand, when the cover is placed in the open position, the cover is maintained at such open position by the provision of support means (34), (35), (37). When a communication device such as a portable telephone (15) is set on the charging device, the back surface (25) of the portable telephone makes contact with the opened cover, whereby the portable telephone is supported in an upright position. In this position, external terminals (30) of the portable telephone make contact with the charging terminals of the charging device and this enables the battery pack (28) housed within the portable telephone to be charged.

9 Claims, 6 Drawing Sheets

BATTERY PACK CHARGING DEVICE

FIELD OF THE INVENTION

The present invention relates to a charging device for charging battery packs used as power sources in communication devices such as portable telephones, cordless telephones and the like, and in particular relates to a charging device that can charge a battery pack while the battery pack remains housed within a communication device.

BACKGROUND ART

Rechargeable battery packs are used in the power supplies of communication devices such as portable telephones, cordless telephones and the like. To charge such a battery pack, it is removed from the communication device in which it is housed and placed into a charging device. However, because of the hassle of having to remove and then reinsert such battery packs, charging devices which allow the communication device itself to be inserted into the charging device have been developed to enable the battery pack to be charged while it remains housed within the communication device. With this type of charging device there is no need to remove and reinsert the battery pack, and therefore the battery back can be charged when the communication device is not being used, such as when the communication device is on standby.

One example of such a battery pack charging device is shown in FIG. 1, in which a battery pack 2 is housed within a communication device 1. In this construction, the communication device 1 is provided with external charging terminals 3 at an external portion thereof, and these external terminals 3 enable electric current to flow to the battery pack via an electrical circuit not shown in the drawing.

A charging device 4 for charging the battery pack 2 of the communication device 1 is provided with exposed charging terminals 6 located within a depression 5 provided in a top portion of the charging device 4. In addition to these elements, a charging circuit not shown in the drawing is provided in the charging device 4 to allow electrical current from a commercial power source to flow to the charging terminals 6.

Now, when the battery pack 2 is to be charged, the section of the communication device 1 which is provided with the external terminals 3 is placed into the depression 5 of the charging device 4. This placement results in the establishment of an electrical connection between the external terminals 3 and the charging terminals 6, which in turn allows an electrical current from the commercial power source to be supplied to the battery pack 2 via the charging circuit. In this way, the battery pack becomes charged.

As is further, the charging device 4 may also be provided with charging terminals 7 for charging a reserve battery pack 9 as a single unit separate from the communication device 1.

Now, as communication devices have become smaller and thinner, they are no longer able to stand up on their own. In response to this problem, the top of the charging device 4 is provided with a back support portion 8 which protrudes upwards and forms a continuous surface with a side surface of the depression 5 so as to make contact with the back surface of the communication device 1 in order to support the communication device 1 in an upright position.

Consequently, it becomes impossible to construct a thin-shaped charging device 4 due to the provision of the back support portion 8. Namely, even though the miniaturization of the communication devices of portable telephones and the like makes it possible to make such communication devices thinner, it is not possible for the charging devices thereof to be made thinner, and this results in a poor overall portability. Furthermore, this problem becomes more important as the development of even thinner communication devices takes place.

Moreover, because the charging terminals 6, 7 lie exposed in top portions of the charging device 4, it is possible for malfunctions to arise due to the presence of dust, moisture or the like.

DISCLOSURE OF THE INVENTION

It is a first object of the present invention to provide a battery pack charging device which can be made compact and thin so as to have excellent portability. It is a second object of the present invention to provide a battery pack charging device which can prevent dust, moisture and the like from accumulating at the charging terminals in order to reduce as much as possible the risk of malfunctions. It is a third object of the present invention to provide a battery pack charging device which can reliably support a communication device in an upright position while a charging process is being carried out.

To accomplish the objects stated above, the charging device according to the present invention is constructed from a main body, a first set of charging terminals provided on the top of the main body to make contact with external terminals of a communication device, and a cover which can be rotated into either an open or closed position with respect to the main body.

In this construction, when the cover is in the closed position, the first set of charging terminals of the main body is covered, and when the cover is in the open position, the cover acts as a support member that makes contact with the communication device to support the communication device in an upright position. Accordingly, it is possible to maintain the communication device in an upright position even when the communication device is a thin-type communication device by leaning the communication device against the cover when the cover is acting as a support member in the open position. On the other hand, when the cover is in the closed position, it covers and protects the charging terminals. Furthermore, when the cover is in the closed position, the overall dimensions of the charging device become roughly the same as the dimensions of the main body. Accordingly, the charging device can be made compact and portable.

Preferably, the charging device is further provided with a support means for maintaining the cover at a prescribed open position. In this way, by maintaining the cover at the open position, it is possible to reliably maintain the communication device in a stable upright position when the communication device is leaning against the cover for support.

One example of such a support means is constructed from a rotation shaft to which the cover is fixed to allow the cover to rotate between the open and closed positions, a disk having notched portions formed in the outer circumference thereof which is fixed to the rotation shaft, and a plate spring connected at one end thereof to the main body and having a protruding portion for mating with the notches of the disk. A second example of such a support means is constructed from a support plate member having one end connected to the underside surface of the cover in a manner that enables the support plate member to be rotatable with respect to the cover, with the other end of the support plate member being insertable into a mating groove that locks the support plate member in place to maintain the cover in the open position. A third example of such a support means is constructed from a lever having a first end that is connected to either the cover or the main body in a manner that enables the lever to be rotatable with respect thereto and a second end which is fixed to a pin which is inserted into a guide groove formed in either the main body or the cover, the guide groove being shaped so as to lock the lever in place when the cover is set in the open position.

Furthermore, a U-shaped cut-away section is preferably formed in the front edge of the cover to receive a back portion of the leaning communication device. In particular, the width of the cut-away section is preferably made to be roughly the same as the width of the communication device in order for the inner side surfaces of the cut-away section to act as guide surfaces which restrict the movement of the communication device in the sideways directions.

Moreover, it is preferred that the first set of charging terminals be provided in a depression formed at a prescribed position in the top of the main body with a shape adapted to receive the base of the communication device. Further, an auxiliary support member is preferably provided at a prescribed position on the underside surface of the cover to make contact with the back surface of the communication device in order to provide additional support of the communication device when the communication device is leaning against the cover. In this case, the auxiliary support member is preferably formed with a shape that allows the auxiliary support member to be stored within the space of the depression when the cover is in the closed position.

In summary, each of the elements described above makes it possible for the cover to reliably maintain the communication device in a stable upright position.

Further, to make it possible to directly charge an individual battery pack separate from the communication device, a second set of charging terminals is preferably provided at a prescribed position on top of the main body. In this case, a stopper means is preferably provided at a prescribed position on top of the main body between the first set of charging terminals and the second set of charging terminals to abut the individual battery pack in order to prevent the individual battery pack from coming into contact with the communication device.

With the above construction, an individual battery pack may be charged at the same time the battery pack housed within the communication device is being charged.

BEST MODE FOR CARRYING OUT THE INVENTION

Figure 1:
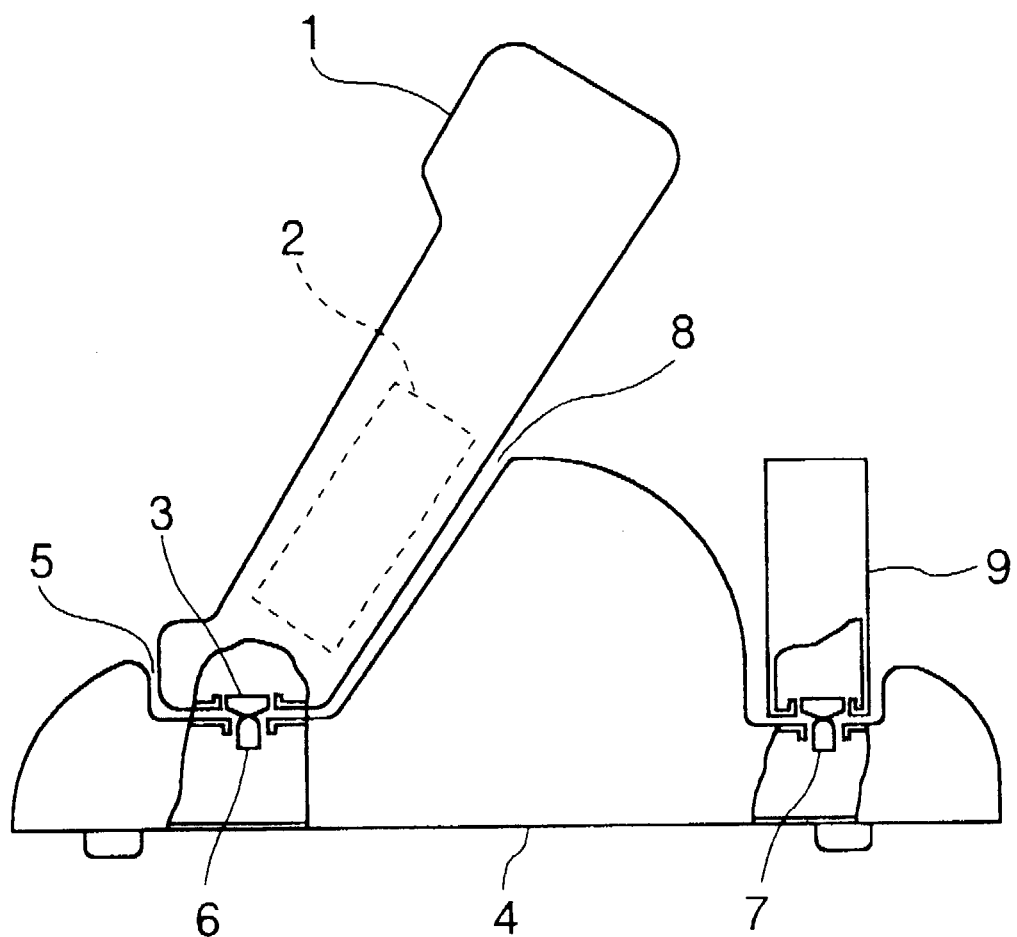
FIG. 1 is a side view of a prior art charging device.
Figure 2:
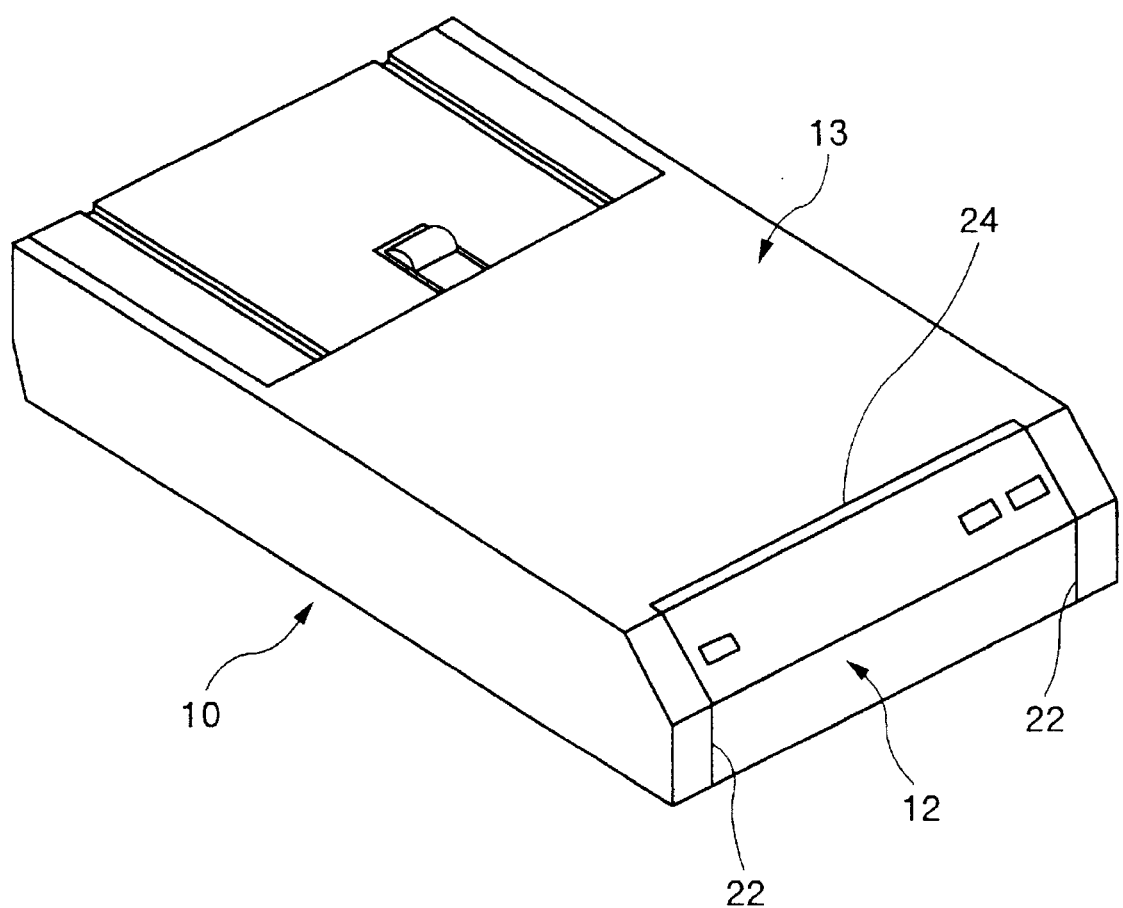
FIG. 2 is a perspective view of a first embodiment of a battery pack charging device according to the present invention.
Figure 3:
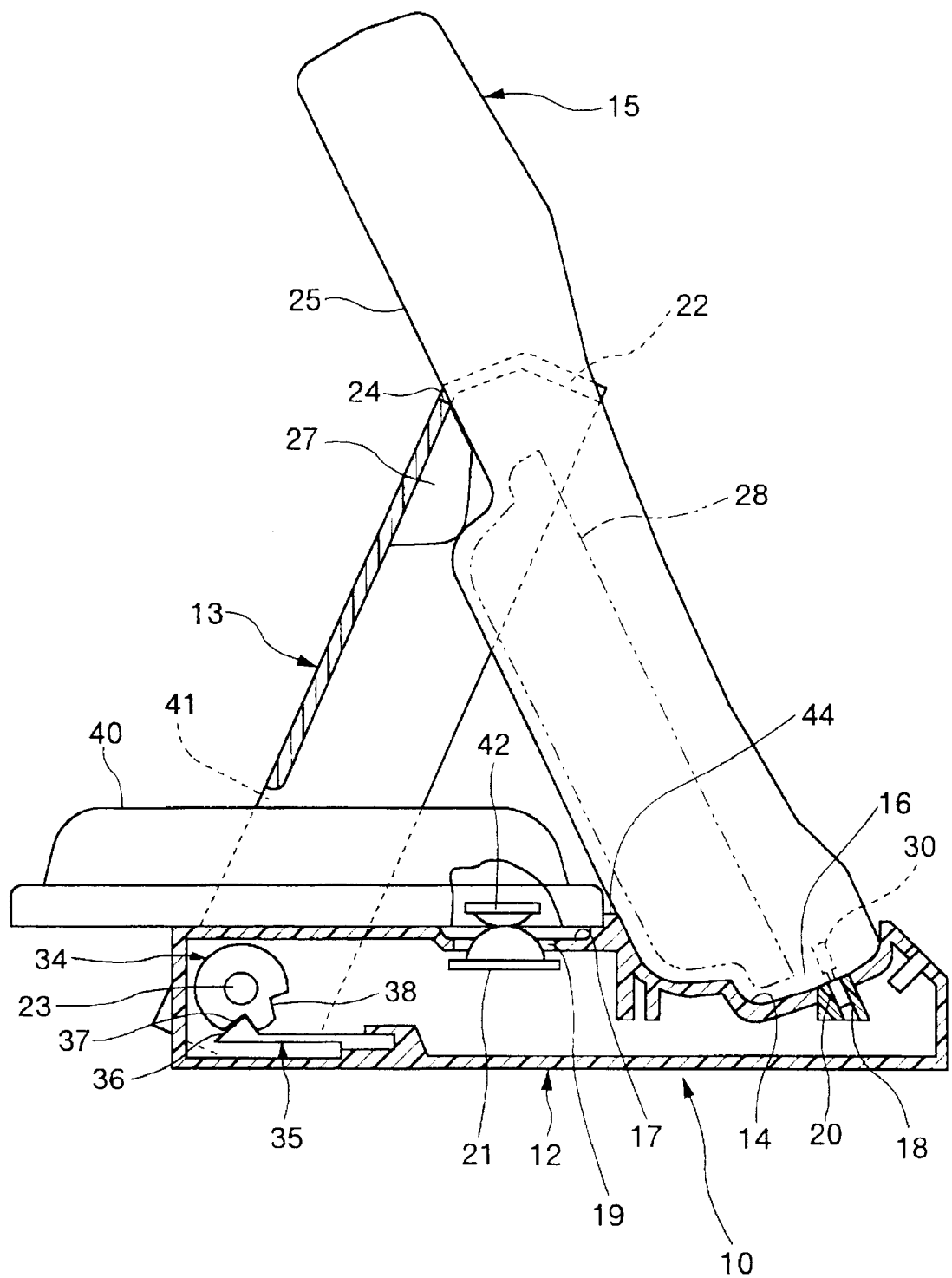
FIG. 3 is a cross-sectional view showing the first embodiment of a battery pack charging device in a state of use.

FIG. 2 is a perspective view of a first embodiment of a charging device according to the present invention, and FIG. 3 is a cross-sectional view of the charging device shown in FIG. 2.

A charging device 10 is constructed from a flat rectangular shaped main body 12 and a cover 13 which covers the upper part of the main body 12. In this connection, both the main body 12 and the cover 13 are formed into prescribed shapes from synthetic resin or the like.

Further, a depression 14 is formed in the top of the main body 12 near the front edge thereof. This depression 14 is formed so as to have a shape that roughly corresponds to the external shape of a base 16 of a communication device, in this case, a portable telephone 15. Namely, by setting the base 16 of the portable telephone 15 into the depression 14, the portable telephone 15 will be supported in an upright position at the time of charging. Further, a shallow depression 17 is formed in the middle of the top of the main body 12. Now, in the depressions 14, 17, openings 18, 19 are respectively formed, and through these openings 18, 19, charging terminals 20, 21 are arranged so that the tips thereof are exposed to the outside. Further, an electrical circuit (not shown in the drawings) for carrying out charging operations is housed inside the main body 12. This electric circuit is used to carry out charging operations by supplying electric current, received from a commercial power source via an electric cord, to the charging terminals 20, 21.

The cover 13 is fixed to a rotation shaft 23 that is arranged at the rear of the main body 12 so as to be freely rotatable with respect to the main body 12, whereby the cover 13 is able to rotate together with the rotation shaft 13 to allow the cover 13 to be moved between open and closed positions. Namely, when the cover 13 is in the closed position, the cover 13 covers the charging terminals 20, 21 provided in the depressions 14, 17 of the main body 12, and when the cover 13 is in the open position, the depressions 14, 17 and the charging terminals provided therein are exposed. Furthermore, when the cover 13 is in the open position, the cover 13 acts as a support portion that supports the portable telephone 15 when the portable telephone 15 is set into the depression 14 of the main body 12. In other words, the portable telephone 15 leans against the cover 13, whereby the portable telephone 15 is supported in an upright position.

Further, an elongated U-shaped cut-away section is formed in the tip of the cover 13, with the width thereof being roughly equal to the width of the portable telephone 15. In this way, both the inner side surfaces of the cut-away section form guide surfaces 22 that make contact with the side surfaces of the leaning portable telephone 15 so as to restrict the portable telephone 15 from moving in the sideways directions. In a similar manner, the back surface (bottom surface) of the cut-away section forms a support surface 24 that makes contact with the back surface 25 of the leaning portable telephone 15 so as to prevent the portable telephone 15 from falling over. In addition to the cut-away section, a protruding auxiliary support member 27 is provided at a prescribed position on the underside surface of the cover 13, namely at a position adjacent to the support surface 24, and this auxiliary support member 27 also makes contact with the back surface 25 of the portable telephone 15. In this way, the base 16 of the portable telephone 15 is in contact with the main body 12 and the back surface 25 and side surfaces of the portable telephone 15 are in contact with the cover 13 to prevent movement in those directions, whereby the portable telephone 15 is maintained in an upright position. Now with regards to the auxiliary support member 27, when the cover 13 is closed, the auxiliary support member 27 fits into the inner space of the depression 14 of the main body 12. Consequently, it is possible to construct the thin charging device 10 shown in FIG. 2 even when the cover 13 is provided with the auxiliary support member 27.

Now, to enable a charging current to reach the battery pack 28 housed with the portable telephone 15, the bottom portion of the portable telephone 15 is provided with external terminals 30 which make contact with the charging terminals 20 of the charging device 10 to form an electrical connection therebetween when the base 16 of the portable telephone 15 is set into the depression 14 of the charging device 10. In this way, the battery pack 28 can be charged while it remains housed within the portable telephone 15.

Further, the charging device 10 is provided with a support means to maintain the cover 13 in either the open or closed position. Namely, the rotation shaft 23 is provided with a disk 34 that is in contact with a plate spring 35 arranged in the main body 12. To maintain the cover in either the open or closed position, a first notch 37 and a second notch 38 are formed at prescribed positions along the outer circumference of the disk 34, and a protruding portion 36 is formed at the tip of the plate spring 35 to mate with either of the first or second notches 37, 38 so as to stop rotational movement of the rotation shaft 23. Specifically stated, when the cover 13 is in the open position, the protruding portion 36 mates with the first notch 37 to lock the cover 13 in the open position, and when the cover 13 is in the closed position, the protruding portion 36 mates with the second notch 38 to lock the cover 13 in the closed position. In this way, the cover 13 can only be locked at prescribed angles in order to maintain the cover 13 in either the open and closed positions.

Now, a reserve battery pack 40 is set on top of the main body 12 from the rear. Namely, a large U-shaped cut-away section 41 is formed in the base end of the cover 13, and with the cover 13 in the open position, the reserve battery pack 40 is passed through the cut-away section 41 and set onto the main body 12. When arranged in this way, terminals 42 of the battery pack 40 are in contact with the charging terminals 21 of the charging device 10 so as to form an electrical connection therebetween, whereby it is also possible for the battery pack 40 to be charged as an individual unit separate from the portable telephone 15. In this connection, the front edge of the reserve battery pack 40 abuts a stopper 44 that is formed as a ridge which is contiguous with the edge of the depression 14 in which the base 16 of the portable telephone 15 sits. In this way, the reserve battery pack 40 is prevented from coming into contact with the portable telephone 15.

In the above-described construction, the cover 13 can be rotated together with the rotation shaft 23 to place the cover 13 in either the open or closed position. In the case where the cover 13 is set in the open position, the cover 13 itself acts as a support member that can support the portable telephone 15 in an upright position even when the portable telephone 15 is a thin-type portable telephone. On the other hand, when the charging device 10 is not in use, by setting the cover 13 in the closed position, the external dimensions of the charging device 10 can be made to be roughly the same as the external dimensions of the main body 12, and this makes it possible for the charging device 10 to be constructed as a thin-type charging device. Consequently, it becomes possible to construct a compact and highly portable charging device. Furthermore, by closing the cover 13, the charging terminals 20, 21 become covered, and this prevents dust, moisture and the like from accumulating on and around the charging terminals.

Figure 4:
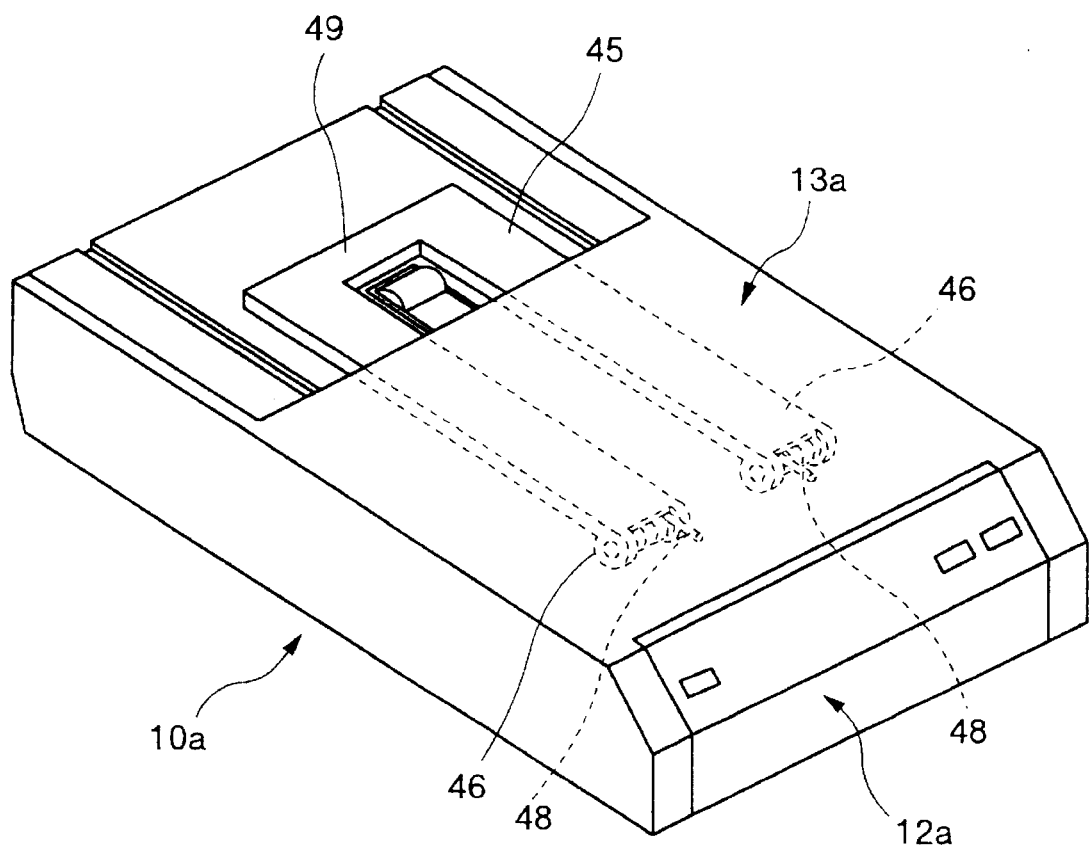
FIG. 4 is a perspective view of a second embodiment of a battery pack charging device according to the present invention.
Figure 5:
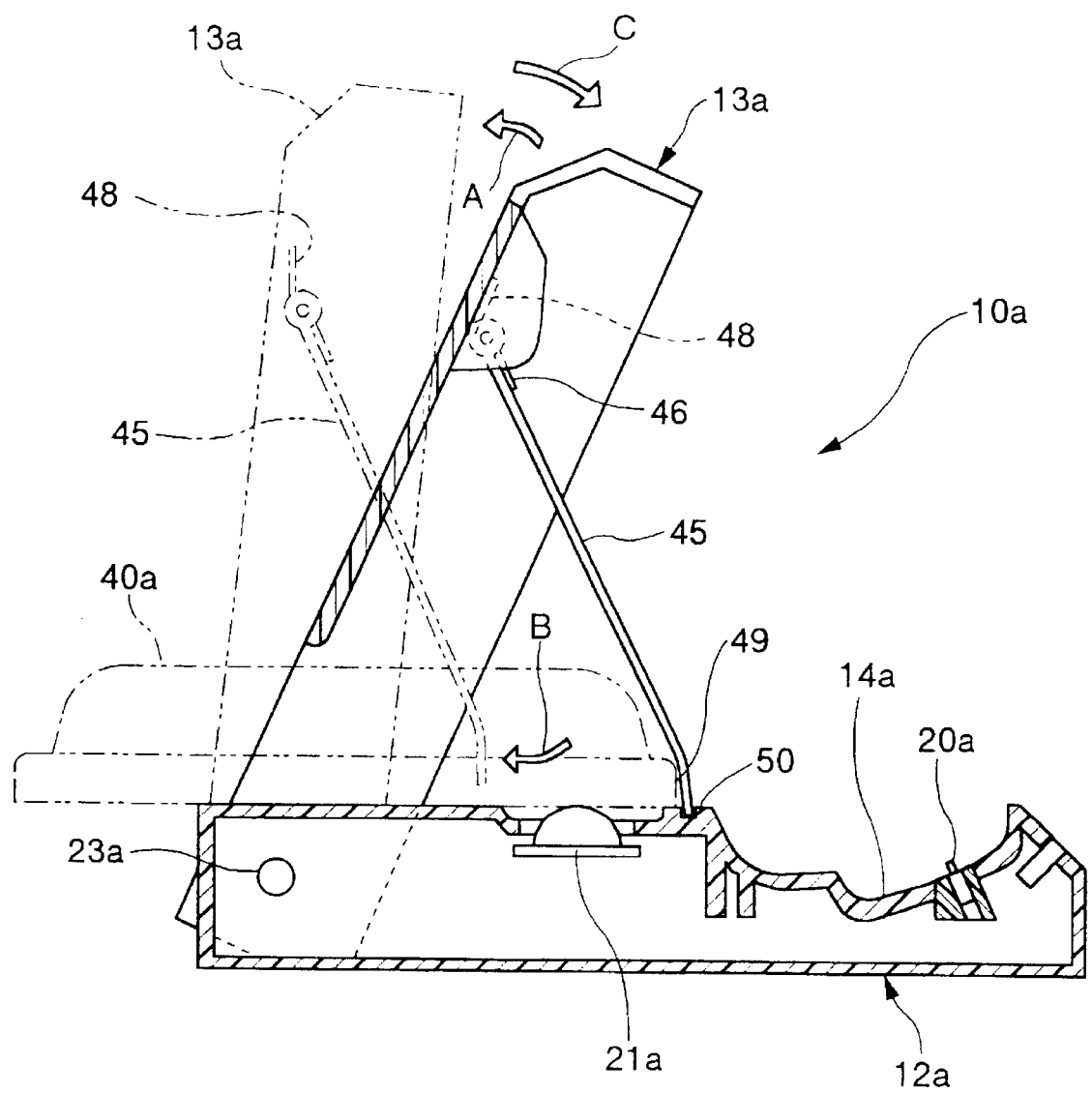
FIG. 5 is a cross-sectional view showing the second embodiment of a battery pack charging device in a state of use.

Next, FIGS. 4 and 5 illustrate a second embodiment of a charging device according to the present invention. As in the first embodiment, the charging device 10a of the second embodiment is constructed from a flat rectangular shaped main body 12a and a cover 13a which covers the upper part of the main body 12a. Further, as shown in FIG. 4, a depression 14a for receiving a portable telephone is formed in the top of the main body 12a at a prescribed position, with charging terminals 20a being provided in the bottom of the depression 14a. In addition to these terminals, separate charging terminals 21a are provided in the middle of the top of the main body 12a for charging a reserve battery pack 40a. Further, the cover 13a is fixed to a rotation shaft 23a to allow the cover 13a to be rotated between open and closed positions. In other words, the basic construction of the charging device 10a of the second embodiment is roughly the same as the basic structure of the charging device of the first embodiment.

However, the support means of the second embodiment which maintains the cover 13a in the prescribed open position is different from that described above for the first embodiment.

Namely, the charging device shown in FIGS. 4 and 5 is provided with a roughly U-shaped support plate member 45 having ends 46 connected to the underside surface of the cover 13a in a manner that enables the support plate member 45 to be rotatable with respect to the cover 13a. Further, the support plate member 45 is provided with a spring member 48 such as a torsion spring or the like which acts to bias the support plate member 45 toward the cover 13a. In this way, when there is no load on the spring member 48, the support plate member 45 runs flush with the underside surface of the cover 13a. In this connection, it is to be noted that the spring member 48 is not limited to the torsion spring described above. Namely, the spring member 48 may be constructed from other biasing means such as a plate spring or the like.

Further, the support plate member 45 has a base 49 which is adapted to be inserted into a mating groove 50 formed in the top of the main body 12a near the edge of the depression 14a. In this construction, when the base 49 is fitted into the groove 50, as shown in FIG. 5, the cover 13a is securely held in the open position. In other words, the insertion of the base 49 into the groove 50 prevents the cover 13a from falling back into the closed position.

Now, when the cover 13a is to be moved from the open position shown in FIG. 5 to the closed position shown in FIG. 4, the cover 13a is first moved a slight amount in the direction indicated by the arrow A in FIG. 5, namely in the direction that causes the cover 13a to further open up. When this is done, the base 49 of the support plate member 45 is pulled out of the groove 50, and then the biasing force of the spring member 48 automatically causes the support plate member 45 to return toward the underside surface of the cover 13a in the direction indicated by the arrow B in FIG. 5. Then, after the support plate member 45 has returned to its position along the underside surface of the cover 13a, the cover 13a is moved in the direction indicated by the arrow C in FIG. 5 to close the cover 13a with the main body 12a. In this connection, because the support plate member 45 is held by the spring member 48 in close contact with the underside surface of the cover 13a, there is no need to provide a special stopper means to maintain the cover 13a in the closed position shown in FIG. 4.

In the case where the cover 13a is to be moved from the closed position to the open position, the cover 13a is first opened up by hand or the like and then the support plate member 45 is pulled away from the underside surface of the cover 13a to insert the base 49 of the support plate member 45 into the groove 50.

Further, when a reserve battery pack 40a is being charged by the charging device 10a, the tip of the reserve battery pack 40a abuts the support plate member 45 and is thereby prevented from coming into contact with the portable telephone placed in the depression 14a. Namely, the support plate member 45 acts as a stopper means.

Moreover, it is to be noted that it is not necessary to provide the spring 48 in the charging device 10a according to the second embodiment. In other words, the support means of the second embodiment of the present invention only requires that the support plate member 45 be freely rotatable with respect to the cover 13a.

Figure 6:
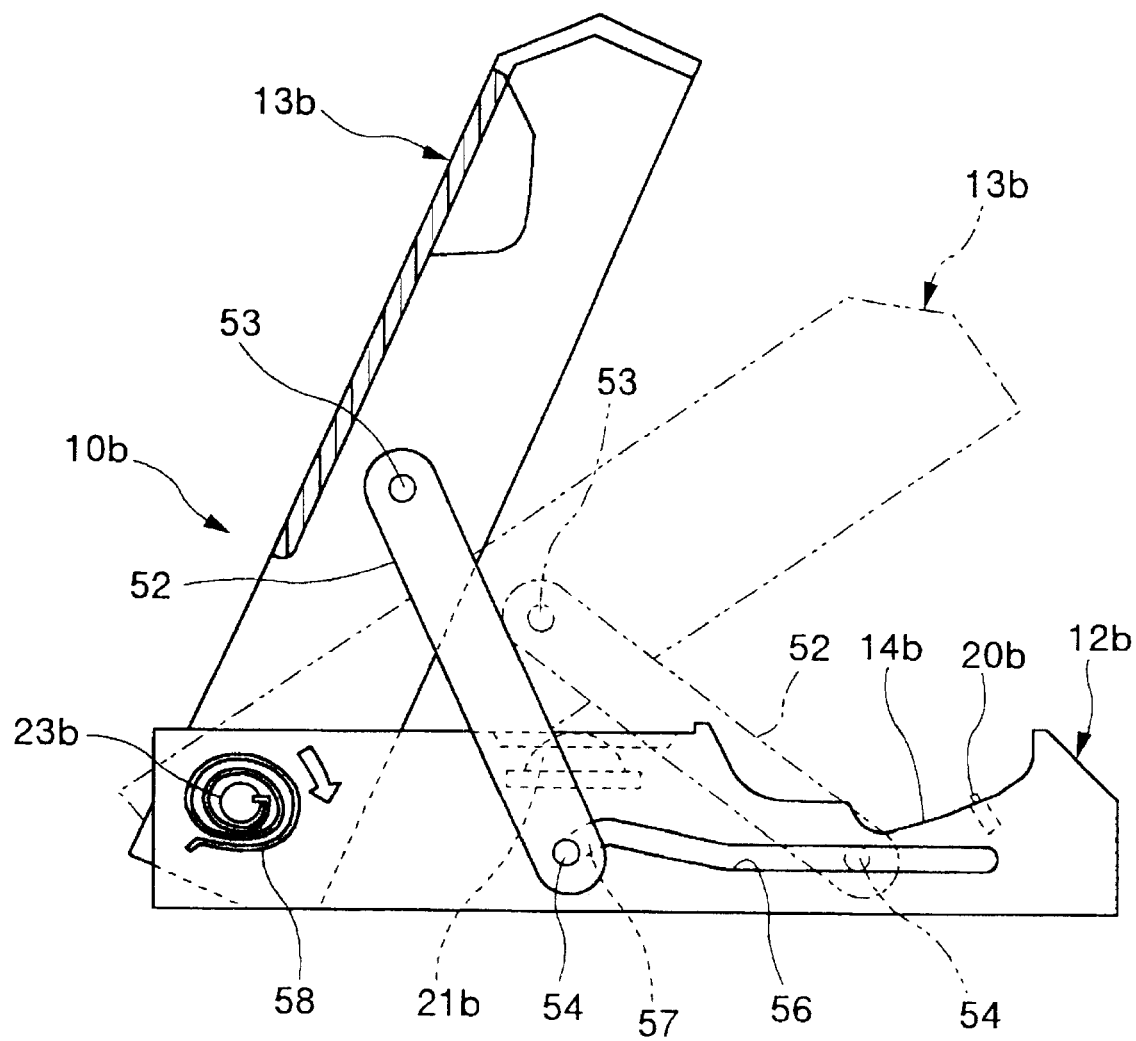
FIG. 6 is a partial cross-sectional view showing a third embodiment of a battery pack charging device according to the present invention in a state of use.

Next, FIG. 6 illustrates a third embodiment of a charging device according to the present invention. As in the first and second embodiments, the charging device 10b of the third embodiment is constructed from a flat rectangular shaped main body 12b and a cover 13b which covers the upper part of the main body 12b. Further, a depression 14b for receiving a portable telephone is formed in the top of the main body 12b at a prescribed position, with charging terminals 20b being provided in the bottom of the depression 14b. In addition to these terminals, separate charging terminals 21b are provided in the middle of the top of the main body 12b for charging a reserve battery pack 40b. Further, the cover 13b is fixed to a rotation shaft 23b to allow the cover 13b to be rotated between open and closed positions. In other words, the basic construction of the charging device 10b of the third embodiment is roughly the same as the basic structure of the charging device of the first and second embodiments.

However, the support means of the third embodiment which maintains the cover 13b in the prescribed open position is different from those described above for the first and second embodiments.

Namely, the charging device 10b is provided with at least one lever 52 having a first end 53 which is connected to the inside of one of the sides of the cover 13b in a manner that enables the lever 52 to be rotatable with respect to the cover 13b. Further, the lever 52 has a second end which is fixed to a pin 54 which is inserted into a guide groove 56 formed in a side of the main body 12b, whereby the second end of the lever 52 is capable of following the path of the guide groove 56. In this connection, the guide groove 56 has a small raised section near a first end portion 57 thereof. Further, the rotation shaft 23b is provided with a spring member 58 comprised of a helical torsion spring which biases the cover 13b in the direction toward the closed position.

In this way, when the cover 13b is being opened, the pin 54 which is fixed to the lever 52 is caused to move along the path of the guide groove 56 in the direction toward the first end portion 57 thereof. Then, once the pin 54 has reached the first end portion 57 of the guide groove 56 after having crossed over the raised section, the biasing force of the spring member 58 holds the pin against the raised section to lock the lever 52 in place, whereby the cover 13b is maintained in the open position. Now, in order to return the cover 13b to the closed position, it is necessary to supply an outside force by hand or the like to pull the pin 54 up and over the raised section toward the other end of the groove 56.

Now, for the third embodiment described above, it is possible to reverse the arrangement of elements of the support means. Namely, one end of the lever can be connected to the main body in a manner that enables the lever to rotate with respect to the main body, and the other end of the lever can be fixed to a pin which is inserted into a guide groove formed in the cover.

In summary, in addition to being able to charge battery packs as individual units, the charging device according to the present invention can be used to charge battery packs while such battery packs remain stored within a communication device. In particular, the cover of the charging device according to the present invention acts as a support member to support even a thin-type communication device in an upright position while the battery pack housed within such communication device is being charged.

We claim:

1. A charging device for charging a battery pack housed within a communication device, comprising:
   a flat-shaped main body;
   first charging terminals provided in the main body, the first charging terminals being adapted to make electrical contact with charge reception terminals of the communication device; and
   a rotatable cover which can be opened and closed by being rotated with respect to the main body, such that when the cover is in a closed position, the cover covers the first charging terminals, and when the cover is in an open position, the cover is in an upright state which enables the cover to act as a support member which is adapted to support at least a back surface of the communication device when the communication device is in a charging position on the charging device.

2. The charging device of claim 1, wherein a cut-away portion is formed in one end of the cover, the cut-away portion having side walls which are adapted to act as guide surfaces (22) which inhibit the communication device from moving in the sideways directions when the communication device is being supported by the cover.

3. A charging device for charging a battery pack housed within a communication device, comprising:
   a main body;
   first charging terminals provided in the main body, the first charging terminals being adapted to make electrical contact with charge reception terminals of the communication device; and
   a cover which can be opened and closed with respect to the main body, such that when the cover is in a closed position, the cover covers the first charging terminals, and when the cover is in an open position, the cover acts as a support member which is adapted to support the communication device when the communication device is in a charging position on the charging device;
   further comprising:
   a depression formed at a prescribed position in the main body for receiving a base portion of the communication device when the communication device is placed on the charging device for charging; and
   an auxilliary support member provided at a prescribed position on the underside surface of the cover, the auxiliary support member being adapted to make contact with a back surface of the communication device when the communication device is being supported by the cover;
   wherein the first charging terminals are provided within the depression and the auxiliary support member is adapted to be stored in a space of the depression when the cover is closed.

4. The charging device of claim 1, 2 or 3 further comprising:
   second charging terminals (21) provided at a prescribed position in the main body, the second charging terminals being adapted to directly charge individual battery packs.

5. The charging device of claim 4, further comprising:
   stopper means (44), (45) provided at a prescribed position on the main body between the first charging terminals and the second charging terminals to prevent an individual battery pack from coming into contact with the communication device when the individual battery pack is being charged.

6. The charging device of claim 1, 2 or 3 further comprising:

cover support means for maintaining the cover at a prescribed open position.

7. The charging device of claim 6, wherein the cover support means comprises:

a rotation shaft (23), the rotation shaft being connected to the cover to enable the cover to rotate between open and closed positions;

a disk (34) having notched portions (37), the disk being connected to the rotation shaft so as to rotate therewith; and a plate spring member (35) having a first end which is connected to the main body and a second end which includes a mating portion which is adapted to mate with the notched portions of the disk to lock the rotation shaft in place in order to maintain the cover in the prescribed open position.

8. The charging device of claim 6, wherein the cover support means comprises:

a support plate member (45) having a first end (46) connected to the underside surface of the cover in a manner that enables the support plate member to rotate with respect to the cover and a second end (49) which can be positioned along the main body; and a support plate stopper means provided at a prescribed position on the main body, the support plate stopper means (50) being adapted to receive and hold the second end of the support plate member in place, whereby the cover is maintained at the prescribed open position.

9. The charging device of claim 6, wherein the cover support means comprises:

a lever (52) having a first end which is connected to either the cover or the main body in a manner that enables the lever to be rotatable thereto and a second end which is connected to a pin, the pin being inserted into a guide groove (56) formed in either the main body or the cover, wherein the guide groove is shaped with a locking portion that locks the pin in place when the cover is placed in the prescribed open position, whereby the cover is maintained in the open position.

* * * * *